Sept. 11, 1923.

F. A. MORRIS

SPECTACLE HINGE

Filed Aug. 7, 1922

1,467,946

Francis A. Morris
INVENTOR

BY Victor J. Evans
ATTORNEY

WITNESS:

Patented Sept. 11, 1923.

1,467,946

UNITED STATES PATENT OFFICE.

FRANCIS A. MORRIS, OF PHILADELPHIA, PENNSYLVANIA, ASSIGNOR TO BACHMANN BROS., OF PHILADELPHIA, PENNSYLVANIA.

SPECTACLE HINGE.

Application filed August 7, 1922. Serial No. 580,356.

*To all whom it may concern:*

Be it known that I, FRANCIS A. MORRIS, a citizen of the United States, residing at Philadelphia, in the county of Philadelphia and State of Pennsylvania, have invented new and useful Improvements in Spectacle Hinges, of which the following is a specification.

This invention relates to hinges for spectacles, and is particularly adapted for use with shell rims and bows.

The principal object is to provide a hinge which shall be securely fastened in place and yet when the bows are out, the hinge will be substantially concealed, and the pins holding the hinge will be entirely concealed.

Another object of the invention is to provide a hinge which shall not only improve the appearance of the spectacle frames, but shall be simple of construction, consisting of few parts, cheap to manufacture and highly efficient for the purpose for which it is designed.

With these and other objects in view, the invention resides in certain novel construction and combination and arrangement of parts, the essential features of which are hereinafter fully described, are particularly pointed out in the appended claims, and are illustrated in the accompanying drawing, in which:—

Like characters of reference refer to like parts in all the views.

Figure 1:
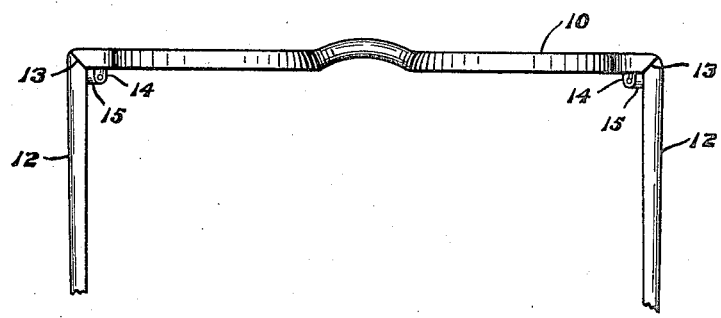
Figure 1 is a top plan view of a pair of spectacle frames embodying my invention.
Figure 2:
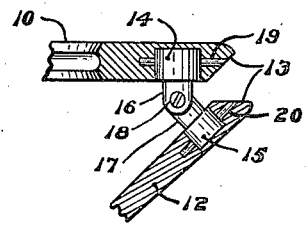
Figure 2 is an enlarged sectional detail of a hinge assembled in one side of a spectacle frame.
Figures 3, 4:
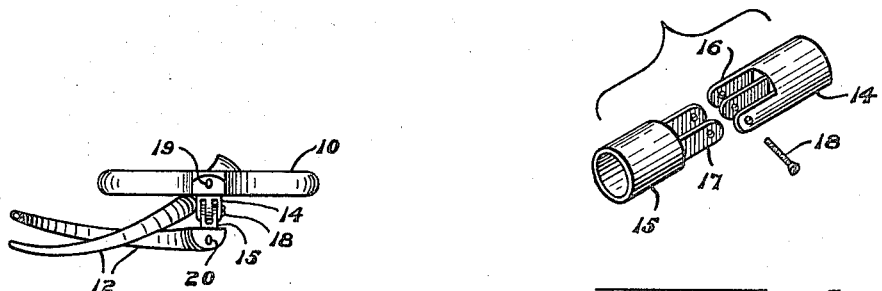
Figure 3 is an end view of the spectacle frame with the bows folded.
Figure 4 is a detached prespective view of the hinge per se.

Referring to the drawing in detail, 10 represents the shell, celluloid, or composition lens frames, and 12 the bows. The bows and frames meet at 13 in a mitre joint and are joined by the hinges which are usually secured in place by pins, the heads of which may be seen at the outside of the frame and the bows.

The present invention utilizes a hinge comprising two cylindrical members 14 and 15 provided at one end with ears 16 and 17, respectively, through which the hinge pin or screw 18 passes. The cylindrical base of member 14 is seated in a suitable aperture formed in the rear of the frame and is held in place by a pin 19 which is inserted at the mitre joint 13. The cylindrical base of member 15 is similarly seated in an aperture near the end of the bow, and held in place by a pin 20 entered at the joint 13.

In this manner I have produced a spectacle frame in which the hinges are substantially out of view when the frame is worn and in which the mitre joint completely conceals the hinge fastening pins.

While I have described what I consider to be the most desirable embodiment of my invention, it is obvious that many of the details may be varied without in any way departing from the spirit of my invention; and I therefore do not limit myself to the exact form herein shown, nor to anything less than the whole of my invention.

Having described my invention, what I claim as new and desire to secure by Letters Patent is:—

1. The combination with the lens frame and bow of spectacle having faces which meet when the elements are extended, of a hinge connecting said frame and bow, and means for securing said hinge in place in said frame and bow and inserted in said frame and bow at said faces.

2. In a device of the class described, the combination of a lens frame having a mitred terminal, a bow having a mitred terminal, a hinge having its opposite ends entered in said frame and bow, and pins entered in said mitred terminals to secure said hinge in place.

In testimony whereof I affix my signature.

FRANCIS A. MORRIS.